United States Patent
Kim et al.

(10) Patent No.: US 10,260,670 B2
(45) Date of Patent: Apr. 16, 2019

(54) PREPARATION METHOD OF SILICA AEROGEL-CONTAINING BLANKET AND SILICA AEROGEL-CONTAINING BLANKET PREPARED BY USING THE SAME

(71) Applicant: LG CHEM, LTD., Seoul (KR)

(72) Inventors: Mi Ri Kim, Daejeon (KR); Jin Hee Oh, Daejeon (KR); Kyoung Shil Oh, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/548,621

(22) PCT Filed: Feb. 4, 2016

(86) PCT No.: PCT/KR2016/001257
§ 371 (c)(1),
(2) Date: Aug. 3, 2017

(87) PCT Pub. No.: WO2016/129874
PCT Pub. Date: Aug. 18, 2016

(65) Prior Publication Data
US 2018/0010726 A1 Jan. 11, 2018

(30) Foreign Application Priority Data

Feb. 13, 2015 (KR) .................. 10-2015-0022594

(51) Int. Cl.
*C01B 33/155* (2006.01)
*C09D 7/63* (2018.01)
*C01B 33/158* (2006.01)
*F16L 59/02* (2006.01)
(Continued)

(52) U.S. Cl.
CPC .............. *F16L 59/026* (2013.01); *B05D 1/18* (2013.01); *C01B 33/155* (2013.01);
(Continued)

(58) Field of Classification Search
CPC .. C01B 33/155; C01B 33/1585; F16L 59/026; C09D 7/63
See application file for complete search history.

(56) References Cited

U.S. PATENT DOCUMENTS 5,789,075 A * 8/1998 Frank ................... B01J 13/0091
252/62
2008/0081014 A1 4/2008 Ahn et al.
(Continued)

FOREIGN PATENT DOCUMENTS

CN 1164222 11/1997
CN 101844771 9/2010
(Continued)

OTHER PUBLICATIONS

Didik Purwanto et al., "Effects of precursors concentration on surface area of silica aerogels synthesized via an ambient pressure drying method," The 1st International Seminar on Fundamental & Application of Chemical Engineering, Nov. 3-4, 2010, pp. A017-1 to A017-4.

*Primary Examiner* — Melvin C. Mayes
*Assistant Examiner* — Michael Forrest
(74) *Attorney, Agent, or Firm* — Dentons US LLP (57) ABSTRACT

Provided are a preparation method of a silica aerogel-containing blanket which includes mixing a water glass solution, a polar organic solvent, and a silazane-based surface modifier to prepare a sol, preparing a silica gel-base material composite by immersion and gelation of a base material for a blanket in the sol, and drying the silica gel-base material composite, and a silica aerogel-containing blanket prepared by using the preparation method.

A silica aerogel-containing blanket having a high degree of hydrophobicity as well as excellent physical properties, particularly, low tap density, high porosity, and excellent (Continued)

mechanical flexibility may be prepared by the minimal use of a surface modifier without a surface modification step by the above method.

19 Claims, 2 Drawing Sheets

(51) Int. Cl.
    *B05D 1/18*    (2006.01)
    *C09D 1/00*    (2006.01)

(52) U.S. Cl.
    CPC ............ *C01B 33/1585* (2013.01); *C09D 1/00* (2013.01); *C09D 7/63* (2018.01); *F16L 59/02* (2013.01); *F16L 59/028* (2013.01)

(56) References Cited

U.S. PATENT DOCUMENTS

| | | |
|---|---|---|
| 2010/0172815 A1 | 7/2010 | Park et al. |
| 2010/0204355 A1 | 8/2010 | Leventis et al. |
| 2010/0247897 A1 | 9/2010 | Leventis et al. |
| 2011/0240907 A1 | 10/2011 | Sharma et al. |
| 2012/0025127 A1 | 2/2012 | Yeo et al. |
| 2012/0171488 A1* | 7/2012 | Yeo ...................... B01J 13/0091 428/401 |
| 2018/0010726 A1 | 1/2018 | Kim et al. |

FOREIGN PATENT DOCUMENTS

| | | |
|---|---|---|
| CN | 102317209 | 1/2012 |
| CN | 103818912 | 5/2014 |
| CN | 104030301 | 9/2014 |
| KR | 10-0385829 | 10/2003 |
| KR | 10-0385829 B1 | 10/2003 |
| KR | 10-2010-0133268 A | 12/2010 |
| KR | 10-2011-0126381 A | 11/2011 |
| KR | 10-1789371 | 10/2017 |
| WO | 1996/006808 A1 | 3/1996 |
| WO | 2008143384 | 11/2008 |
| WO | 2009033065 | 3/2009 |
| WO | 2010/143902 A2 | 12/2010 |

* cited by examiner

PREPARATION METHOD OF SILICA AEROGEL-CONTAINING BLANKET AND SILICA AEROGEL-CONTAINING BLANKET PREPARED BY USING THE SAME

CROSS-REFERENCE TO RELATED APPLICATIONS

This application is a National Stage Entry of International Application No. PCT/KR2016/001257 filed on Feb. 4, 2016, and claims the benefit of Korean Application No. 10-2015-0022594, filed on Feb. 13, 2015, all of which are hereby incorporated by reference in their entirety for all purposes as if fully set forth herein.

TECHNICAL FIELD

The present invention relates to a preparation method of a silica aerogel-containing blanket, in which a blanket having excellent mechanical flexibility as well as low thermal conductivity may be prepared by forming and including a hydrophobic silica aerogel having a high degree of hydrophobicity as well as excellent physical properties, particularly, low tap density and high porosity, by the minimal use of a surface modifier without separate solvent substitution and surface modification steps, and a silica aerogel-containing blanket prepared by using the same.

BACKGROUND ART

Recently, interests in an aerogel having excellent insulation properties have grown as industrial technologies are modernized. Aerogels developed to date may include an organic aerogel, such as resorcinol-formaldehyde or melamine-formaldehyde aerogel particles, and an inorganic aerogel including metal oxide such as a silica ($SiO_2$), alumina ($Al_2O_3$), titania ($TiO_2$), or carbon (C) aerogel.

Among these aerogels, the silica aerogel is a highly porous material, wherein since the silica aerogel has high porosity and specific surface area as well as low thermal conductivity, applications in various areas, such as heat insulation materials, catalysts, sound-absorbing materials, and interlayer dielectric materials of a semiconductor circuit, are expected. Although commercialization rate is very low due to complex manufacturing processes and low mechanical strength, early application products have been released as a result of continuous research, and the expansion of the market including the heat insulation materials is increasingly faster.

Since the silica aerogel has low mechanical strength due to its porous structure, the silica aerogel is normally commercialized in a form, such as an aerogel blanket or aerogel sheet, by compositing with a base material such as glass fibers, ceramic fibers, or polymer fibers.

For example, with respect to a silica aerogel-containing blanket using the silica aerogel, it is prepared by the steps of silica sol preparation, gelation, aging, and surface modification. However, with respect to the typical method of preparing a silica aerogel-containing blanket as described above, the process is complex and is uneconomical in terms of time and cost. Also, the surface modification step of the silica aerogel is essential, and a large amount of organic solvent and an expensive hydrophobic agent are used for this purpose. In addition, since recovery and separation processes of by-products generated in the surface modification step are essential, there are a lot of difficulties in the commercialization of the silica aerogel-containing blanket.

Furthermore, alkoxide or water glass is mainly used as a silica precursor during the preparation of the silica aerogel blanket. However, since the alkoxide is more expensive than the water glass, economic efficiency may be low. Also, the water glass may be less expensive and safer than the alkoxide, but, since a step of solvent substitution to an organic solvent is essentially required, processing time may be increased, an excessive amount of wastewater may be generated, and an expensive surface modifier may be used in the surface modification step.

With respect to aerogel powder, manufacturing techniques, such as a simultaneous substitution method and a co-precursor method, for omitting the solvent substitution step or reducing an amount of the used surface modifier have been developed, but, with respect to the blanket, since solvent diffusion in the gel is not easy in comparison to the aerogel powder, the above processes are not easy to be used.

Therefore, there is a need to develop a method which may omit the surface modification step or may reduce the amount of the used surface modifier during the preparation of the blanket using the silica aerogel.

DISCLOSURE OF THE INVENTION

Technical Problem

An aspect of the present invention provides a preparation method of a silica aerogel-containing blanket, in which a blanket having excellent mechanical flexibility as well as low thermal conductivity may be prepared by forming and including a hydrophobic silica aerogel having a high degree of hydrophobicity as well as excellent physical properties, particularly, low tap density and high porosity, by the minimal use of a surface modifier without separate solvent substitution and surface modification steps.

Another aspect of the present invention provides a silica aerogel-containing blanket prepared by using the above preparation method.

Another aspect of the present invention provides a heat insulation material including the silica aerogel-containing blanket prepared by using the above preparation method.

Technical Solution

According to an aspect of the present invention, there is provided a preparation method of a silica aerogel-containing blanket including: mixing a water glass solution, a polar organic solvent, and a silazane-based surface modifier to prepare a sol; preparing a silica gel-base material composite by immersion and gelation of a base material for a blanket in the sol; and drying the silica gel-base material composite.

According to another aspect of the present invention, there is provided a silica aerogel-containing blanket prepared by using the preparation method.

According to another aspect of the present invention, there is provided a heat insulation material including the silica aerogel-containing blanket prepared by using the preparation method.

Advantageous Effects

A hydrophobic silica aerogel-containing blanket may be easily prepared without separate solvent substitution and surface modification steps by a preparation method according to the present invention. Also, with respect to the above preparation method, since a hydrophobic treatment on a silica aerogel is possible by using a minimum amount of a surface modifier, the amount of the surface modifier used may be reduced and the amounts of organic solvent and by-products, which may generated in a typical surface modification step, may be reduced.

Furthermore, since the blanket prepared by the above preparation method may have low thermal conductivity and excellent mechanical flexibility by including a silica aerogel having a high degree of hydrophobicity as well as excellent physical properties, particularly, low tap density and high porosity, the blanket may be used in various industrial areas, for example, heat insulation materials, lagging materials, or non-flammable materials.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Figure 1:
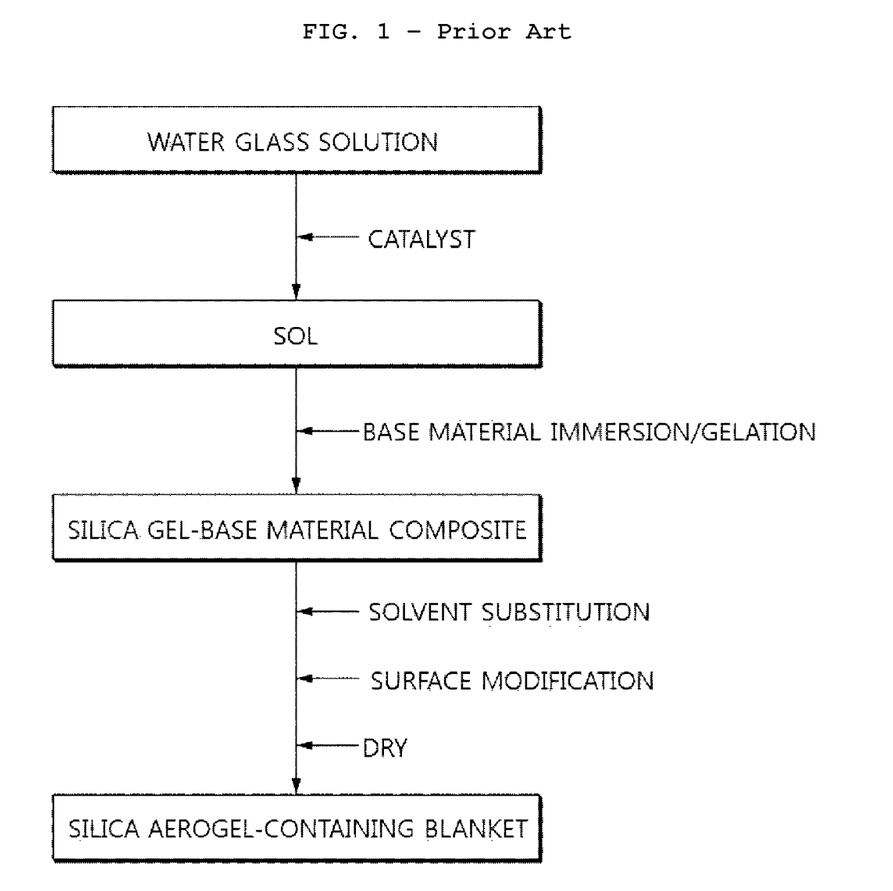
FIG. 1 is a block diagram sequentially illustrating a process of preparing a silica aerogel-containing blanket using a typical hydrogel.

FIG. 1 is a block diagram sequentially illustrating a process of preparing a silica aerogel-containing blanket using a typical hydrogel. As illustrated in FIG. 1, in a typical case, an acid catalyst is added to a water glass solution, which is prepared by mixing water glass with water, and solated, a base material for a blanket is immersed in the prepared sol and gelated to prepare a silica gel-base material composite, and a silica aerogel-containing blanket is then prepared by performing solvent substitution, surface modification, and drying processes on the silica gel-base material composite. Thus, the typical method of preparing a silica aerogel-containing blanket may have limitations in that the preparation process is complex, a large amount of wastewater is generated due to the use of an organic solvent during the solvent substitution, and an excessive amount of a surface modifier is consumed in the surface modification step.

In contrast, in the present invention, since the solvent substitution step may be omitted by adding a polar organic solvent, such as methanol, and a surface modifier together in a sol during the preparation of a silica aerogel-containing blanket using water glass to increase the dispersibility of the polar organic solvent in a gel and the surface modifier is rapidly decomposed in the polar organic solvent to participate in gelation in the form of alkoxysilane, a silica aerogel-containing blanket having low thermal conductivity and excellent mechanical flexibility may be easily prepared by including a silica aerogel having a high degree of hydrophobicity as well as excellent physical properties, particularly, low tap density and high porosity, by using a minimum amount of the surface modifier without a separate surface modification step.

Specifically, a method of preparing a silica aerogel-containing blanket according to an embodiment of the present invention includes the steps of: mixing a water glass solution, a polar organic solvent, and a silazane-based surface modifier to prepare a sol (step 1); preparing a silica gel-base material composite by immersion and gelation of a base material for a blanket in the sol (step 2); and drying the silica gel-base material composite (step 3).

Figure 2:
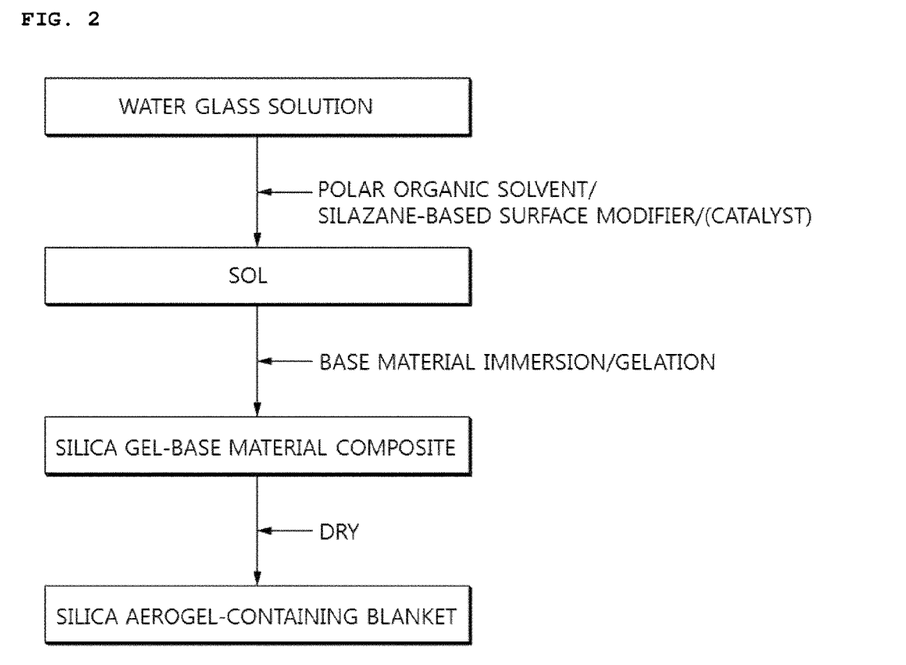
FIG. 2 is a block diagram sequentially illustrating a process of preparing a silica aerogel-containing blanket according to an embodiment of the present invention.

FIG. 2 is a block diagram sequentially illustrating a process of preparing a silica aerogel-containing blanket according to an embodiment of the present invention. FIG. 2 is only an example to illustrate the present invention, and the present invention is not limited thereto. Hereinafter, each step will be described in detail with reference to FIG. 2.

Step 1

In the preparation method of a silica aerogel-containing blanket according to the embodiment of the present invention, step 1 is a step of preparing a sol using a water glass solution.

Specifically, the sol may be prepared by mixing and reacting a polar organic solvent and a silazane-based surface modifier in the water glass solution.

Since the water glass solution is hydrophilic, phase separation may occur when the surface modifier having hydrophobicity is directly added. Typically, fibers are immersed in a uniform single-phase sol and then left standing to be gelated to prepare a blanket, but, in a case in which stirring and gelation is performed in a state of phase separation as described above, preparation in the form of a blanket may be impossible. In contrast, since the polar organic solvent is used in the present invention, a uniform single-phase sol may be prepared by using the polar organic solvent without phase separation even if the hydrophobic surface modifier is added to the water glass solution.

The water glass solution is a dilute solution which is prepared by adding water, particularly, distilled water, to water glass and mixing the solution. Specifically, in the water glass solution, the water glass is not particularly limited, but the water glass may include silica ($SiO_2$) in an amount of 28 wt % to 35 wt % based on a total weight of the water glass and the water glass solution diluted by adding water to the water glass may include silica in an amount of 0.1 wt % to 30 wt % based on a total weight of the water glass solution. In the water glass solution, in a case in which the amount of silica is less than 0.1 wt %, an amount of the silica aerogel in the finally prepared blanket is small, and, in a case in which the amount of silica is greater than 30 wt %, mechanical properties, particularly, flexibility, of the blanket may be reduced due to the excessive formation of the silica aerogel. Also, with respect to the water glass solution, the amount of silica may be appropriately adjusted within the above-described range depending on whether materials used in the formation of the sol, for example, the surface modifier, are hydrated or not. For example, the water glass solution may include silica in an amount of 5 wt % to 20 wt % based on the total weight of the water glass solution.

Also, the water used in the preparation of the water glass solution may be used in a proportion of 0.1 mol to 120 mol based on 1 mol of silica ($SiO_2$) included in the sol. In a case in which the amount of the water used is less than 0.1 mol, the rate of surface modification may be reduced, and, in a case in which the amount of the water used is greater than 120 mol, the degree of hydrophobicity of the finally prepared silica aerogel may be reduced. Specifically, the water may be used in a concentration of 0.1 mol to 110 mol, for example, 1 mol to 10 mol or 1 mol to 3 mol, based on 1 mol of silica.

Furthermore, during the preparation of the water glass solution, an acid catalyst may be further selectively used.

The acid catalyst may not only promote solation of the water glass solution, but may also promote the decomposition of the surface modifier. Specifically, at least one of inorganic acids, such as nitric acid, hydrochloric acid, acetic acid, sulfuric acid, and hydrofluoric acid, may be used as the acid catalyst, and the acid catalyst may be used in an amount of 20 parts by weight or less, for example, 1 part by weight to 15 parts by weight, based on 100 parts by weight of the water glass solution. When the acid catalyst is added during the preparation of the water glass solution, the water glass solution may be solated. Accordingly, the polar organic solvent and the silazane-based surface modifier may be subsequently added to a sol which is prepared by mixing the water glass solution and the acid catalyst.

Since the polar organic solvent used in the preparation of the sol has excellent miscibility with the above-described water glass solution, the polar organic solvent may be uniformly present in a gel during the subsequent gelation. As a result, the solvent substitution step may be omitted during the subsequent preparation of the silica gel-base material composite. Also, the polar organic solvent reacts and decomposes the silazane-based compound used as the surface modifier to form alkoxysilane which may act as a co-precursor. Since the alkoxysilane co-precursor participates in the gelation of the silica, the alkoxysilane co-precursor may enable the hydrophobization of the silica gel without a subsequent separate surface modification step.

The polar organic solvent may specifically be an alcohol-based solvent. Also, the alcohol-based solvent may specifically be a monovalent alcohol such as methanol, ethanol, isopropanol, and butanol; or a polyvalent alcohol such as glycerol, ethylene glycol, propylene glycol, diethylene glycol, dipropylene glycol, and sorbitol, and any one thereof or a mixture of two or more thereof may be used. Among these alcohol-based solvents, the alcohol-based solvent may be a monovalent alcohol having 1 to 8 carbon atoms in consideration of miscibility with the water and uniform dispersibility in the silica gel. Also, in consideration of the efficiency of the subsequent modification reaction on the surface of the silica in addition to the above-described effect, the polar organic solvent may be a linear monovalent alcohol having 1 to 4 carbon atoms, such as methanol, ethanol, propanol, or n-butanol, and one alone or a mixture of two or more thereof may be used. For example, the polar organic solvent may be methanol, ethanol, or a mixture thereof.

The above-described polar organic solvent may be added to a stoichiometric amount or more in consideration of the reaction with the silazane-based surface modifier. Specifically, the polar organic solvent may be used in an amount of 5 parts by weight to 20 parts by weight based on 1 part by weight of the silica included in the sol. For example, in consideration of a significant effect of improvement due to the use of the above-described polar organic solvent, the polar organic solvent may be used in an amount of 5 parts by weight to 16 parts by weight, for example, 7 parts by weight to 10 parts by weight, based on 1 part by weight of the silica.

Also, the silazane-based surface modifier used in the preparation of the sol may surface modify the silica aerosol to be hydrophobic during the preparation of the silica aerogel-containing blanket.

The silazane-based surface modifier may specifically be a silazane-based compound including two or more alkyl groups in one molecule, and, for example, may be a compound of Formula 1 below:

[Formula 1]

In Formula 1, $R^{11}$ each independently represents a hydrogen atom or an alkyl group having 1 to 8 carbon atoms, and $R^{12}$ each independently represents a hydrogen atom or an alkyl group having 1 to 8 carbon atoms, wherein at least two functional groups among the entire functional groups corresponding to $R^{11}$ and $R^{12}$, particularly, six functional groups, are alkyl groups.

Specific examples of the silazane-based compound may be 1,2-diethyldisilazane, 1,1,2,2-tetramethyldisilazane, 1,1,3,3-tetramethyldisilazane, 1,1,1,2,2,2-hexamethyldisilazane, 1,1,2,2-tetraethyldisilazane, or 1,2-diisopropyldisilazane, and one alone or a mixture of two or more thereof may be used.

Among these silazane-based compounds, in order to further increase the hydrophobicity of the silica aerogel, the silazane-based surface modifier may be tetraalkyldisilazane including two hydrogen atoms as well as four alkyl groups having 1 to 4 carbon atoms; or hexaalkyldisilazane including six alkyl groups having 1 to 4 carbon atoms among the silazane-based compounds of Formula 1, and, for example, may be hexamethyldisilazane (HMDS) or 1,1,3,3-tetramethyldisilazane.

Also, the silazane-based surface modifier may be used in an amount of 0.6 part by weight to 2 parts by weight based on 1 part by weight of the silica included in the sol. In a case in which the amount of the silazane-based surface modifier is less than 0.6 part by weight, the degree of hydrophobicity of the finally prepared silica aerogel may be low and the tap density may increase, and, in a case in which the amount of the silazane-based surface modifier is greater than 2 parts by weight, an effect of improvement in tap density characteristics and degree of hydrophobicity characteristics may be insignificant in comparison to the amount added. In consideration of a significant effect of improvement due to the use of the silazane-based surface modifier, the silazane-based surface modifier may be used in an amount of 0.6 part by weight to 1.8 parts by weight, or 0.6 part by weight to 1.2 parts by weight, based on 1 part by weight of the silica.

An alkoxysilane-based compound, which is formed by the decomposition reaction due to the polar organic solvent of the silazane-based surface modifier, is included in the sol prepared according to the above-described method. The alkoxysilane-based compound may act as a co-precursor during the subsequent gelation to hydrophobize the silica. Accordingly, a hydrophobic surface modification step of the silica aerogel may be omitted during the preparation of the silica aerogel-containing blanket. As a result, the amounts of the organic solvent and surface modifier used may be reduced, and processing time and preparation costs may be reduced.

Specifically, the alkoxysilane-based compound formed in the reaction solution may be a trialkylalkoxysilane-based compound (in this case, the alkyl, as a functional group derived from the silazane-based surface modifier, is specifically an alkyl group having 1 to 8 carbon atoms, and the alkoxy group, as a functional group derived from the polar organic solvent, is specifically an alkoxy group having 1 to 8 carbon atoms).

For example, in a case in which the silazane-based surface modifier is trimethyldisilazane, an alkoxysilane-based compound, such as trimethylmethoxysilane, may be formed when the trimethyldisilazane is decomposed by alcohol as in the following Reaction Formula 1.

[Reaction Formula 1]

In Reaction Formula 1, R, as a functional group derived from the alcohol-based solvent, may be an alkyl group, particularly an alkyl group having 1 to 8 carbon atoms, and more particularly a linear alkyl group having 1 to 4 carbon atoms.

Typically, since the silazane-based surface modifier including trimethyldisilazane has a large amount of hydrophobic group, i.e., alkyl group, included in the molecule, the degree of hydrophobicity may be increased during the surface modification of the silica. Thus, the silazane-based surface modifier is being used as a surface modifier or hydrophobic agent of the silica aerogel. However, since one molecule of the silazane-based compound may react with two hydrophilic groups (—OH) on the surface of the silica, a large amount of the silazane-based compound may be required for the surface modification of the silica. In contrast, in a case in which the silazane-based compound is decomposed by the alcohol as in Reaction Formula 1, two molecules of the alkoxysilane-based compound may be formed from one molecule of the silazane-based compound. Also, the formed alkoxysilane-based compound may further increase the degree of hydrophobicity during the surface modification of the silica aerogel by including the maximum three alkyl groups in one molecule. Furthermore, the alkoxysilane-based compound may participate in the gelation by acting as a co-precursor and may minimize the amount of the surface modifier used for the hydrophobization of the silica aerogel.

Also, ammonia, which is formed as a result of the decomposition reaction of the silazane-based surface modifier, may increases pH by being dissolved in the sol containing the alkoxysilane-based compound and may reduce the amount of base used for the promotion of the subsequent gelation of the silica sol. Simultaneously, the ammonia formed as a result of the decomposition reaction may facilitate the control of gelation rate and efficiency by having a multistep reaction effect with the base subsequently added.

Specifically, the sol containing the alkoxysilane-based compound may have a pH of 5 to 9 due to the formation of the above-described ammonia.

Step 2

In the preparation method of a silica aerogel-containing blanket according to the embodiment of the present invention, step 2 is a step of preparing a silica gel-base material composite by immersion and gelation of a base material for a blanket in the sol prepared in step 1.

Examples of the base material for a blanket may be fibers, a film, a sheet, a net, a textile, a porous body, a foam body, a non-woven fabric body, or a laminate of two or more layers thereof. Also, the base material for a blanket may have surface roughness on its surface or may be patterned depending on the application thereof. For example, the base material for a blanket may be a textile which may further improve heat insulation performance by including a space or pores through which the insertion of the aerogel into the base material for a blanket is facilitated. Furthermore, the base material for a blanket may have low thermal conductivity.

Specific examples of the base material for a blanket may be polyamide, polybenzimidazole, polyaramide, acryl resin, phenol resin, polyester, polyetheretherketone (PEEK), polyolefin (e.g., polyethylene, polypropylene, or a copolymer thereof), cellulose, carbon, cotton, wool, hemp, non-woven fabric, glass fibers, or ceramic wool, and the present invention is not limited thereto. For example, the base material may include at least one selected from the group consisting of glass fibers, polyethylene, and polyester.

Also, the base material for a blanket may have low thermal conductivity and may have a thermal conductivity of 20 mW/mk or less, particularly 10 mW/mk to 20 mW/mk, and more particularly 15 mW/mk.

Furthermore, the base material for a blanket may be subjected to a hydrophobic treatment. The hydrophobic treatment of the base material for a blanket may be performed by a typical method. Specifically, a halogen-substituted or unsubstituted linear aliphatic hydrocarbon group (alkyl group having 1 to 20 carbon atoms, alkylene group having 2 to 20 carbon atoms, etc.), an aromatic hydrocarbon group (aryl group having 6 to 20 carbon atoms), an organic silicon group, or a combined group thereof may be used, and, for example, the hydrophobic treatment may be performed by the surface treatment of the base material for a blanket using a compound which includes a hydrophobic functional group such as a halogenated alkyl group, a silyl group, an aminosilyl group, an alkyl group, a vinyl group, an allyl group, an aryl group, an arylalkyl group, or an alkylaryl group.

Specifically, the compound for the hydrophobic treatment may be a silane-based or siloxane-based compound including the above-described hydrophobic functional group. Examples of the compound may be hexamethyldisilazane (HMDS), trimethyl chlorosilane (TMSCL), silicone oil, amino silane, alkyl silane, polydimethyl siloxane (PDMS), or dimethyl dichlorosilane (DDS), and any one thereof or a mixture of two or more thereof may be used.

Also, the surface treatment method is not particularly limited, but the surface of a carbon coating layer may be coated with a hydrophobic material by chemical vapor deposition (CVD) or physical vapor deposition (PVD), wherein fluidized bed chemical vapor deposition, rotating disc chemical vapor deposition, or vibration chemical vapor deposition may be used as the chemical vapor deposition, and sputtering, vacuum evaporation, or plasma coating may be used as the physical vapor deposition. According to the result of the above-described hydrophobic treatment, a hydrophobic functional group is present on the surface of the base material for a blanket, and as a result, the adhesion to the hydrophobic aerogel may be further improved.

The base material for a blanket may have low density, and, specifically, in a case in which the base material is a textile, fibers constituting the textile may have an average diameter of 10 μm to 30 μm.

Also, a functional layer, such as a heat reflective layer for improving the heat insulation performance or a surface protective layer capable of improving life characteristics through surface protection, may be further formed on a part or all of the base material for a blanket.

For example, the heat reflective layer may include a compound which may reflect or block infrared radiation, and, specifically, carbon black, carbon fibers, titanium dioxide, metals (aluminum, stainless steel, a copper/zinc alloy, a copper/chromium alloy, etc.), non metals, fibers, and pigments may be included. Also, the surface protective layer may include a heat-resistant waterproof material such as polytetrafluoroethylene.

The lamination of the functional layer may be performed by directly forming the functional layer on at least one surface of a heat insulation blanket or by disposing and then laminating the functional layer. The lamination process may be performed by a typical method such as a heat treatment or a hot rolling treatment.

When the above-described base material for a blanket is immersed in the sol prepared in step 2, a silica gel-base material composite may be prepared by the gelation.

After the preparation of the silica gel-base material composite and before the subsequent drying process, at least one process of a stabilization process, a pre-aging process, and an aging process may be further selectively performed on the prepared silica gel-base material composite. Thus, the preparation method of a silica aerogel-containing blanket according to the embodiment of the present invention may further include at least one process of the stabilization process, the pre-aging process, and the aging process which are performed after the preparation of the silica gel-base material composite.

The stabilization process may be performed by maintaining the silica gel-base material composite, which is prepared after the completion of the gelation, in a temperature of 18° C. to 25° C. for 10 minutes to 30 minutes.

Also, the pre-aging process may be performed by maintaining the silica gel-base material composite after the completion of the gelation or after the stabilization process in a temperature of 50° C. to 70° C. for 1 hour to 6 hours. In a case in which the temperature during the pre-aging process is greater than 70° C., the polar organic solvent having a low boiling point, such as methanol, may be evaporated. For example, the pre-aging process may be performed by maintaining the silica gel-base material composite in a temperature of 60° C. to 70° C. for 3 hours to 5 hours.

Furthermore, the aging process is a process for the completion of the chemical change by allowing the silica gel-base material composite to be left standing at an appropriate temperature, wherein a network structure in the silica gel may be strengthened by the aging process of the silica gel-base material composite. Also, moisture in the silica gel may be substituted with the polar organic solvent during the aging, and, as a result, deformation and reduction of a pore structure of the silica gel due to the evaporation of the moisture in the silica gel may be prevented in the subsequent drying process.

Specifically, the aging process may be performed by maintaining the silica gel-base material composite in the polar organic solvent in a temperature of 50° C. to 80° C. In this case, the type of the polar organic solvent is the same as that described above. However, the polar organic solvent may be used in an amount corresponding to a volume that is one to three times that of the sol to which the surface modifier is added before the gelation.

In this case, a base may be further added for the promotion of the reaction. The base may be the same as that described above, and the base may be mixed with the polar organic solvent and added. Specifically, the base may be added to an amount of 20 parts by weight or less, for example, 1 part by weight to 15 parts by weight, based on 100 parts by weight of the polar organic solvent added during the aging process.

Also, the aging process may be performed until the chemical change in the silica gel-base material composite is completed and may be specifically performed for 30 minutes to 6 hours or 30 minutes to 4 hours.

For example, the preparation method of a silica aerogel-containing blanket according to the embodiment of the present invention may include a step of sequentially performing the pre-aging process, in which the silica gel-base material composite is maintained in a temperature of 50° C. to 70° C. for 1 hour to 6 hours, and the aging process in which the pre-aged silica gel-base material composite is maintained in the polar organic solvent in a temperature of 50° C. to 80° C.

Step 3

In the preparation method of a silica aerogel-containing blanket according to the embodiment of the present invention, step 3 is a step of preparing a silica aerogel-containing blanket by drying the silica gel-base material composite prepared in step 2.

The drying process may be specifically performed by a supercritical drying process using supercritical carbon dioxide or an atmospheric drying process.

Carbon dioxide ($CO_2$) is a gaseous state at room temperature and atmospheric pressure, but, since an evaporation process does not occur when exceeding the limit of constant temperature and high pressure, so-called a supercritical point, carbon dioxide is in a supercritical state in which gas and liquid may not be distinguished, and the carbon dioxide in the supercritical state is referred to as "supercritical carbon dioxide". With respect to the supercritical carbon dioxide, since the density of the molecule is close to that of a liquid but its viscosity is low, the supercritical carbon dioxide has a behavior close to that of a gas. Also, since diffusion is fast and thermal conductivity is high, drying efficiency is high and drying process time may be reduced.

The supercritical drying process may be performed by a typical method except that the silica gel-based material composite prepared in step 2 is used. Specifically, in the supercritical drying process, the silica gel-based material composite is put in a supercritical dry reactor, and a solvent substitution process is then performed in which the reactor is filled with $CO_2$ in a liquid state and the alcohol solvent in the silica aerogel is substituted with $CO_2$. Thereafter, the temperature is increased to 40° C. to 50° C. at a constant heating rate, particularly, a rate of 0.1° C./min to 1° C./min, and the silica gel-based material composite is maintained above a pressure at which carbon dioxide becomes a supercritical state, particularly, in a pressure of 100 bar to 150 bar, and is then maintained in the supercritical state of carbon dioxide for a predetermined time, particularly, 20 minutes to 1 hour. In general, carbon dioxide becomes a supercritical state at a temperature of 31° C. and a pressure of 73.8 bar. The silica gel-based material composite is maintained at predetermined temperature and predetermined pressure, at which carbon dioxide becomes a supercritical state, for 2 hours to 12 hours, for example, 2 hours to 6 hours, and the pressure may then be slowly removed to complete the supercritical drying process.

Also, the atmospheric drying process may be performed by a typical method such as natural drying at atmospheric pressure (1±0.3 atm).

Furthermore, after the above-described drying process, an additional drying process may be further selectively performed on the dried silica aerogel-containing blanket.

Specifically, the additional drying process may be performed on the silica aerogel-containing blanket at a temperature of 120° C. to 180° C. within 1 hour, and, in this case, in order to prevent the shrinkage of the aerogel structure due to the rapid drying of the remaining solvent in the prepared blanket, the drying process may also be performed in such a manner that the blanket is wrapped with a metal foil, such as an aluminum foil, and a plurality of holes are made in the foil.

As a result of the above-described drying process, a blanket, which includes a porous silica aerogel having nano-sized pores, may be prepared. The silica aerogel has a high degree of hydrophobicity as well as excellent physical properties, particularly, low tap density and high porosity, and the silica aerogel-containing blanket including the silica aerogel has excellent mechanical flexibility as well as low thermal conductivity.

In consideration of optimum combination of preparation conditions in each preparation step and a significant effect of improvement in the physical properties of the silica aerogel-containing blanket thus prepared, the preparation method of a silica aerogel-containing blanket according to the embodiment of the present invention may include: mixing a water glass solution, a linear alcohol having 1 to 4 carbon atoms as a polar organic solvent, and a silazane-based surface modifier including two or more alkyl groups in the molecule to prepare a sol including silica and an alkoxysilane-based compound which is formed by the decomposition reaction of the polar organic solvent and the silazane-based surface modifier; preparing a silica gel-base material composite by immersion and gelation of a base material for a blanket in the sol; sequentially performing a pre-aging process, in which the silica gel-base material composite is maintained in a temperature of 50° C. to 70° C. for 1 hour to 6 hours, and an aging process in which the pre-aged silica gel-base material composite is maintained in the polar organic solvent in a temperature of 50° C. to 80° C.; and supercritical drying the aged silica gel-base material composite.

Thus, according to another embodiment of the present invention, provided are a silica aerogel-containing blanket prepared by the above method and a heat insulation material.

Specifically, the blanket includes silica aerogel at least one surface and inside of the base material for a blanket. For example, the silica aerogel may be included in an amount of 20 wt % to 80 wt % based on a total weight of the blanket. Heat insulation may increase as the amount of the silica aerogel in the blanket is increased, but, in a case in which the amount of the silica aerogel is greater than 80 wt %, strength and adhesion may be reduced during the subsequent preparation of the blanket due to the low strength and adhesion of the silica aerogel itself. Also, in a case in which the amount of the silica aerogel in the blanket is excessively low, particularly, less than 20 wt %, the heat insulation may be reduced.

Also, the silica aerogel included in the blanket has a porous particulate structure including a plurality of micropores, wherein it includes a microstructure, in which nano-sized primary particles, particularly, primary particles having an average particle diameter ($D_{50}$) of 100 nm or less, for example, 1 nm to 50 nm, are combined to form a cluster in the form of a mesh, i.e., a three-dimensional network structure.

Accordingly, porosity, tap density, a specific surface area, or an average particle diameter of the silica aerogel may be adjusted through the control of the preparation process during the preparation of the silica aerogel, and, as a result, thermal conductivity and heat insulation of the blanket may be controlled.

Specifically, the silica aerogel may have a porosity of 90% or more and a tap density of 0.04 $g/cm^2$ to 0.5 $g/cm^2$. Also, an average pore diameter may be 20 nm or less or 5 nm to 15 nm. The tap density of the silica aerogel may be measured using a tap density tester (TAP-2S, Logan Instruments Co.), and pore diameter and porosity may be measured based on the amounts of nitrogen, which are adsorbed and desorbed according to partial pressure (0.11<$p/p_o$<1), using a Micromeritics ASAP 2010 analyzer.

Also, the silica aerogel may have a specific surface area of 700 $m^2/g$ or more and an average particle diameter ($D_{50}$) of 10 μm to 80 μm. For example, the specific surface area may be in a range of 700 $m^2/g$ to 1,000 $m^2/g$ and the average particle diameter ($D_{50}$) may be in a range of 10 μm to 80 μm. In the present invention, the specific surface area of the silica aerogel may be measured based on the amounts of nitrogen, which are adsorbed and desorbed according to partial pressure (0.11<$p/p_o$<1), using a Micromeritics ASAP 2010 analyzer. Furthermore, the average particle diameter ($D_{50}$) may be defined as a particle diameter at 50% in a cumulative particle diameter distribution. In this case, the average particle diameter of the silica aerogel may be measured by using a laser diffraction method. Specifically, the silica aerogel is dispersed in a solvent, the solvent is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

Low thermal conductivity and improved heat insulation effect may be obtained within the above-described tap density, specific surface area, particle diameter, and pore diameter ranges due to the volume occupied by the pores.

Furthermore, the silica aerogel may exhibit hydrophobicity by itself or may be hydrophobically surface-treated.

Typically, in a silica aerogel, a degree of hydrophobicity or a hydrophobic degree may be identified by an amount of carbon included in the silica aerogel. Accordingly, the silica aerogel, which may be used in the preparation of the silica aerogel-containing blanket according to the embodiment of the present invention, may include carbon in an amount of 9 wt % or more or 12 wt % or more based on a total weight of the silica aerogel.

Since the above-described blanket includes the silica aerogel having a high degree of hydrophobicity as well as excellent physical properties, particularly, low tap density and high porosity, the blanket has low density and excellent mechanical flexibility as well as low thermal conductivity. Accordingly, the blanket is suitable for heat insulation materials, lagging materials, or non-flammable materials of aircraft, ships, automobiles, and building structures as well as plant facilities for insulation such as an industrial furnace or pipes of various industrial equipment.

Specifically, the silica aerogel-containing blanket may have a thermal conductivity of 20 mW/mk or less, for example, 15 mW/mk to 20 mW/mk. In the present invention, the thermal conductivity may be measured for the blanket including the silica aerogel by using a thermal conductivity meter.

Hereinafter, the present invention will be described in more detail, according to the following examples and experimental examples. However, the following examples and experimental examples are merely presented to exemplify the present invention, and the scope of the present invention is not limited thereto.

Example 1

72.41 g of distilled water was added and mixed with 27.59 g of water glass to prepare a water glass solution including 8 wt % of silica. 11 g of $HNO_3$ (70%) was added in small portions to the water glass solution while stirring at a rate of 500 rpm or more by using a vibration mixer to prepare a sol.

42.1 ml of methanol (MeOH) was added to 52.6 ml of the sol prepared as above and mixed, and 5 ml of HMDS was then added thereto while stirring at a rate of 500 rpm or more by using a vibration mixer. After the addition of the HMDS, a pH of the sol was in a range of about 7 to about 9. The sol was poured into a mold containing a polyethylene terephthalate textile (81 g/m², thickness 11 mm) to immerse the textile and gelation was completed in about 1 minute. Pre-aging was performed by maintaining the silica gel-textile composite at 60° C. for 5 hours in an oven, and 200 ml of MeOH was then added and an aging process was performed at the same temperature as that of the pre-aging for 30 minutes. Thereafter, the aged silica gel-textile composite was put in an extractor of supercritical equipment, and supercritical drying was performed using supercritical $CO_2$. As a result, a dried silica aerogel-containing blanket was obtained.

Example 2

A silica aerogel-containing blanket was prepared in the same manner as in Example 1 except that pre-aging was performed for 4 hours.

Example 3

A silica aerogel-containing blanket was prepared in the same manner as in Example 1 except that 4 ml of HMDS was added.

Comparative Example 1

82 g of distilled water was added and mixed with 18 g of water glass to prepare a water glass solution including 5.228% of silica. 3.7 ml of acetic acid was added to each 100 ml of the solution while stirring the water glass solution to prepare a sol.

100 ml of the sol was poured into a plastic mold containing a polyethylene terephthalate textile (81 g/m², thickness 11 mm) to immerse the textile. When gelation was completed after 10 minutes, aging was performed at 80° C. for 50 minutes in an oven. 157.7 ml of MeOH, 8.3 ml of HMDS, and 0.055 ml of $HNO_3$ were mixed to prepare a surface modification solution with 5% v/v of HMDS. After removing the MeOH from the mold, the surface modification solution was added and surface modification was performed at 50° C. for 5 hours in an oven.

After the surface modification was completed, the silica gel-textile composite was put in an extractor of supercritical equipment, and supercritical drying was performed using supercritical $CO_2$. As a result, a dried silica aerogel-containing blanket was obtained.

Comparative Example 2

A silica aerogel-containing blanket was prepared in the same manner as in Comparative Example 1 except that a step of solvent substitution was further performed at 50° C. for 40 minutes in an oven by adding 250 ml of MeOH to the mold after the aging.

Comparative Example 3

A silica aerogel-containing blanket was prepared in the same manner as in Comparative Example 2 except that the solvent substitution process of step 2 was repeated twice.

Comparative Example 4

A silica aerogel-containing blanket was prepared in the same manner as in Comparative Example 3 except that the solvent substitution process of step 2 was repeated three times (total 2 hours).

Experimental Example

Thermal conductivity was evaluated for the silica aerogel-containing blankets prepared in Examples 1 to 3 and Comparative Examples 1 to 4. The results thereof are presented in Table 1 below.

In this case, the thermal conductivity was measured at 25° C. using a thermal conductivity meter (HFM 436 Lambda, NETZSCH).

TABLE 1

|  | Base gel | HMDS* (ml) | Pre-aging** | Aging | Number of solvent substitution | Presence of surface modification step | Total time*** (hr) | Thermal conductivity (mW/mk) |
| --- | --- | --- | --- | --- | --- | --- | --- | --- |
| Example 1 | Co-precursor gel | 5 | 60° C., 5 hours | 60° C., 30 minutes | 0 | X | 5.5 | 15.94 |
| Example 2 |  | 5 | 60° C., 4 hours | 60° C., 30 minutes |  |  | 4.5 | 17.89 |
| Example 3 |  | 4 | 60° C., 5 hours | 60° C., 30 minutes |  |  | 5.5 | 16.71 |
| Comparative Example 1 | hydrogel | — | — | 80° C., 50 minutes | 0 | HMDS 5% v/v (5 hours) | 6 | 26.91 |
| Comparative Example 2 |  | — |  |  | 1 |  | 6.7 | 18.39 |
| Comparative Example 3 |  | — |  |  | 2 |  | 7.4 | 16.04 |
| Comparative Example 4 |  | — |  |  | 3 |  | 8 | 15.72 |

*amount of HDMS added to the water glass solution as a co-precursor in the step of preparing a sol (hydrogel is not applicable because it is surface modified after the gelation)
**co-precursor gel is pre-aged at a temperature lower than that of the aging of the hydrogel to prevent the evaporation of MeOH
***total time except for supercritical drying As illustrated in Table 1, with respect to Examples 1 to 3 in which the silica aerogel blankets were prepared by using the co-precursor gel, aerogel blankets having low thermal conductivity may be prepared without the solvent substitution and surface modification steps and a significant reduction in the processing time was possible in comparison to Comparative Examples 1 to 4 in which the silica aerogel-containing blankets were prepared by using the hydrogel. Specifically, with respect to Examples 1 to 3, the processing time was reduced by 2 hours or more, the amount of the solvent used was reduced by about 7.5 L/L-gel, and the amount of the surface modifier used was reduced by about 40%, in comparison to Comparative Examples 1 to 4.

Also, in Examples 1 to 3, since the degree of hydrophobicity of the silica aerogel was increased as the amount of the surface modifier added to the sol and the pre-aging time were increased, lower thermal conductivity was obtained. Form the above results, it may be understood that a silica aerogel-containing blanket having a more improved effect in terms of the degree of hydrophobicity and the thermal conductivity may be prepared through the control of the preparation process including the amount of the surface modifier during the preparation of the silica aerogel.

The invention claimed is:

1. A preparation method of a silica aerogel-containing blanket, the preparation method comprising:
    mixing a water glass solution, an alcohol-based solvent, and a silazane-based surface modifier to prepare a sol including silica and an alkoxysilane-based compound which is formed by decomposition of the silazane-based surface modifier and the alcohol-based solvent;
    preparing a silica gel-base material composite by immersion and gelation of a base material for a blanket in the sol; and
    drying the silica gel-base material composite.

2. The preparation method of claim 1, wherein the water glass solution comprises silica in an amount of 0.1 wt % to 30 wt % based on a total weight of the water glass solution.

3. The preparation method of claim 1, wherein the water glass solution further comprises an acid catalyst.

4. The preparation method of claim 1, wherein the alcohol-based solvent is a linear alcohol having 1 to 4 carbon atoms.

5. The preparation method of claim 1, wherein the silazane-based surface modifier comprises a silazane-based compound including two or more alkyl groups in a molecule.

6. The preparation method of claim 1, wherein the silazane-based surface modifier is a compound of Formula 1:

[Formula 1]

in Formula 1, $R^{11}$ each independently represents a hydrogen atom or an alkyl group having 1 to 8 carbon atoms, and $R^{12}$ each independently represents a hydrogen atom or an alkyl group having 1 to 8 carbon atoms, wherein at least two functional groups among entire functional groups corresponding to $R^{11}$ and $R^{12}$ are alkyl groups.

7. The preparation method of claim 1, wherein the silazane-based surface modifier comprises any one selected from the group consisting of tetraalkyldisilazane and hexaalkyldisilazane or a mixture of two or more thereof, and the alkyl is an alkyl group having 1 to 4 carbon atoms.

8. The preparation method of claim 1, wherein the silazane-based surface modifier is used in an amount of 0.6 part by weight to 2 parts by weight based on 1 part by weight of silica included in the sol.

9. The preparation method of claim 1, wherein the base material for a blanket is any one selected from the group consisting of fibers, a film, a sheet, a net, a textile, a porous body, a foam body, and a non-woven fabric body, or a laminate of two or more thereof.

10. The preparation method of claim 1, wherein the base material for a blanket comprises at least one selected from the group consisting of glass fibers, polyethylene, and polyester.

11. The preparation method of claim 1, further comprising at least one process selected from the group consisting of a stabilization process, a pre-aging process, and an aging process of the silica gel-base material composite, after preparing the silica gel-base material composite.

12. The preparation method of claim 11, wherein the pre-aging process is performed by maintaining the silica gel-base material composite in a temperature of 50° C. to 70° C. for 1 hour to 6 hours.

13. The preparation method of claim 11, wherein the aging process is performed by maintaining the silica gel-base material composite in a hydrophilic polar organic solvent in a temperature of 50° C. to 80° C.

14. The preparation method of claim 1, further comprising a step of sequentially performing a pre-aging process in which the silica gel-base material composite is maintained in a temperature of 50° C. to 70° C. for 1 hour to 6 hours, and an aging process in which the pre-aged silica gel-base material composite is maintained in an alcohol-based solvent in a temperature of 50° C. to 80° C.

15. The preparation method of claim 1, wherein the drying is performed by supercritical drying process or an ambient pressure drying process.

16. The preparation method of claim 15, wherein the supercritical drying process is performed by using supercritical carbon dioxide.

17. A preparation method of a silica aerogel-containing blanket, the preparation method comprising:
    mixing a water glass solution, a linear alcohol having 1 to 4 carbon atoms as a hydrophilic polar organic solvent, and a silazane-based surface modifier including two or more alkyl groups in a molecule to prepare a sol including silica and an alkoxysilane-based compound which is formed by the decomposition reaction of the silazane-based surface modifier and a hydrophilic polar organic solvent;
    preparing a silica gel-base material composite by immersion and gelation of a base material for a blanket in the sol;
    sequentially performing a pre-aging process in which the silica gel-base material composite is maintained in a temperature of 50° C. to 70° C. for 1 hour to 6 hours, and an aging process in which the pre-aged silica gel-base material composite is maintained in the hydrophilic polar organic solvent in a temperature of 50° C. to 80° C.; and
    supercritical drying of the aged silica gel-base material composite.

18. The preparation method of claim 17, wherein the silazane-based surface modifier is hexamethyldisilazane, and the alkoxysilane-based compound is trimethylmethoxysilane.

19. The preparation method of claim 1, wherein the sol is a single-phase sol.

* * * * *

UNITED STATES PATENT AND TRADEMARK OFFICE
CERTIFICATE OF CORRECTION

PATENT NO. : 10,260,670 B2
APPLICATION NO. : 15/548621
DATED : April 16, 2019
INVENTOR(S) : Mi Ri Kim

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 3 days.

Signed and Sealed this
Seventeenth Day of March, 2020

Andrei Iancu
*Director of the United States Patent and Trademark Office*